United States Patent
Ishihara et al.

(10) Patent No.: US 11,827,376 B2
(45) Date of Patent: Nov. 28, 2023

(54) ENHANCED GROUND PROXIMITY WARNING SYSTEM THAT SELECTIVELY OPERATES IN BOTH A HELICOPTER MODE AND A FIXED-WING MODE

(71) Applicant: HONEYWELL INTERNATIONAL INC., Charlotte, NC (US)

(72) Inventors: Yasuo Ishihara, Redmond, WA (US); Supratik Gon, Bangalore (IN)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 0 days.

(21) Appl. No.: 17/804,956

(22) Filed: Jun. 1, 2022

(65) Prior Publication Data
US 2023/0331397 A1    Oct. 19, 2023

(30) Foreign Application Priority Data
Apr. 19, 2022    (IN) .............................. 202211022909

(51) Int. Cl.
| | |
|---|---|
| *B64D 45/04* | (2006.01) |
| *G08G 5/02* | (2006.01) |
| *B64D 47/00* | (2006.01) |
| *B64C 29/00* | (2006.01) |

(52) U.S. Cl.
CPC .......... *B64D 45/04* (2013.01); *B64C 29/0033* (2013.01); *B64D 47/00* (2013.01); *G08G 5/02* (2013.01)

(58) Field of Classification Search
None
See application file for complete search history.

(56) References Cited

U.S. PATENT DOCUMENTS

| | | | | |
|---|---|---|---|---|
| 5,507,453 | A * | 4/1996 | Shapery | B64C 29/0025 244/73 C |
| 6,583,733 | B2 * | 6/2003 | Ishihara | B64D 45/04 701/9 |
| 6,622,066 | B2 | 9/2003 | Ishihara et al. | |
| 9,096,314 | B2 | 8/2015 | Brotherton-Ratcliffe et al. | |
| 9,159,241 | B1 * | 10/2015 | Murphy | G08G 5/0021 |
| 9,633,567 | B1 | 4/2017 | Skoog et al. | |
| 11,029,684 | B2 | 6/2021 | Matuszeski et al. | |

(Continued)

FOREIGN PATENT DOCUMENTS

| | | |
|---|---|---|
| CN | 105913694 B | 9/2018 |
| CN | 111152919 A | 5/2020 |

(Continued)

*Primary Examiner* — Fekadeselassie Girma
(74) *Attorney, Agent, or Firm* — Lorenz & Kopf, LLP

(57) ABSTRACT

A system and method are provided for controlling operations of an enhanced ground proximity warning system (EGPWS) disposed within an aircraft that is configured to selectively operate in both a helicopter mode and a fixed-wing mode. A processor processes one or more aircraft flight parameters to determine when the aircraft is operating in the helicopter mode and when the aircraft is operating in the fixed-wing mode. The EGPWS is commanded, via the processor, to operate as a helicopter EGPWS when the aircraft is operating in the helicopter mode, and is commanded, via the processor, to operate as a fixed-wing EGPWS when the aircraft is operating in the fixed-wing mode.

20 Claims, 6 Drawing Sheets

(56) References Cited

U.S. PATENT DOCUMENTS

| | | | |
|---|---|---|---|
| 2002/0030607 A1* | 3/2002 | Conner | B64D 45/04 340/967 |
| 2002/0036574 A1* | 3/2002 | Ishihara | G01C 5/005 340/963 |
| 2002/0099478 A1 | 7/2002 | Ishihara et al. | |
| 2003/0016145 A1* | 1/2003 | Bateman | B64D 43/02 340/967 |
| 2005/0113985 A1* | 5/2005 | Greene | G08G 5/045 701/9 |
| 2010/0305784 A1* | 12/2010 | Anderson | G01C 23/005 701/9 |
| 2011/0234425 A1* | 9/2011 | Germanetti | G08G 5/045 340/945 |
| 2020/0140079 A1 | 5/2020 | Campbell | |
| 2020/0354049 A1 | 11/2020 | Noppel et al. | |
| 2023/0092896 A1* | 3/2023 | Zuckerman | G06Q 50/28 705/338 |

FOREIGN PATENT DOCUMENTS

| | | |
|---|---|---|
| WO | 2019056172 A1 | 3/2019 |
| WO | 2020237528 A1 | 12/2020 |

* cited by examiner

ENHANCED GROUND PROXIMITY WARNING SYSTEM THAT SELECTIVELY OPERATES IN BOTH A HELICOPTER MODE AND A FIXED-WING MODE

CROSS REFERENCE TO RELATED APPLICATION

The present application claims benefit of prior filed India Provisional Patent Application No. 202211022909, filed Apr. 19, 2022, which is hereby incorporated by reference herein in its entirety.

TECHNICAL FIELD

The present invention generally relates to enhanced ground proximity warning systems (EGPWSs), and more particularly relates to an EGPWS that can selectively operate in either a helicopter mode or a fixed-wing mode.

BACKGROUND

The aircraft envisioned for use as urban air mobility (UAM) aircraft are typically configured as vertical take-off and landing (VTOL) aircraft. These aircraft, as well as VTOL aircraft presently used in other domains, such as military domains, can selectively operate in both a helicopter mode and a fixed-wing mode. More specifically, VTOL aircraft can take-off and land like a helicopter (i.e., helicopter mode) and cruise like a fixed-wing aircraft (i.e., fixed-wing mode). Therefore, some VTOL aircraft flight operations may involve flying characteristics of both a helicopter and fixed-wing aircraft in one flight.

One of the avionic systems that is (or will be) installed in UAM aircraft is the enhanced ground proximity warning system (EGPWS). As is generally known, the EGPWS uses various aircraft inputs and an internal database to predict and warn flight crews of potential conflicts with obstacles or terrain, thereby significantly reducing the risk of controlled flight into terrain. As is also generally known, an EGPWS disposed on a helicopter is configured slightly differently than an EGPWS disposed on a fixed-wing aircraft. In particular, the EGPWS in a helicopter has warning thresholds set to allow the aircraft to fly at lower altitudes and in more congested areas, and to land outside of an airport environment, without triggering an alert, whereas the EGPWS in a fixed-wing aircraft has alert thresholds associated with relatively higher altitude, lower congested flight operations.

Hence, there is a need for a system and method that allows for an EGPWS to function as a helicopter EGPWS when an aircraft is operating as in the helicopter mode, and as a fixed-wing EGPWS when the aircraft is operating in the fixed-wing mode. The present disclosure addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a system for an aircraft that is configured to selectively operate in both a helicopter mode and a fixed-wing mode includes an enhanced ground proximity warning system (EGPWS), at least one sensor, and a processor. The EGPWS is configured, in response to a command, to selectively operate as a helicopter EGPWS or as a fixed-wing EGPWS. The at least one sensor is configured to sense at least one aircraft flight parameter and to supply sensor data representative of the at least one aircraft flight parameter. The processor is in operable communication with the at least one sensor and is configured to: process the sensor data to determine when the aircraft is operating in the helicopter mode and when the aircraft is operating in the fixed-wing mode; command the EGPWS to operate as the helicopter EGPWS when the aircraft is operating in the helicopter mode; and command the EGPWS to operate as the fixed-wing EGPWS when the aircraft is operating in the fixed-wing mode.

In another embodiment, a method for controlling operations of an enhanced ground proximity warning system (EGPWS) disposed within an aircraft that is configured to selectively operate in both a helicopter mode and a fixed-wing mode includes processing, in a processor, one or more aircraft flight parameters to determine when the aircraft is operating in the helicopter mode and when the aircraft is operating in the fixed-wing mode. The EGPWS is commanded, via the processor, to operate as a helicopter EGPWS when the aircraft is operating in the helicopter mode, and is commanded, via the processor, to operate as a fixed-wing EGPWS when the aircraft is operating in the fixed-wing mode.

In yet another embodiment, a system for an aircraft that is configured to selectively operate in both a helicopter mode and a fixed-wing mode includes an enhanced ground proximity warning system (EGPWS), a flight management system (FMS), and a processor. The EGPWS is configured, in response to a command, to selectively operate as a helicopter EGPWS or as a fixed-wing EGPWS. The FMS is configured to at least supply a signal representative of a phase of flight of the aircraft. The processor is coupled to receive the signal from the FMS and is configured, upon receipt thereof, to: command the EGPWS to operate as the helicopter EGPWS when the signal indicates the phase of flight of the aircraft is either a takeoff mode or an approach mode, and command the EGPWS to operate as the fixed-wing EGPWS when the phase of flight of the aircraft is neither the takeoff mode nor the approach mode.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
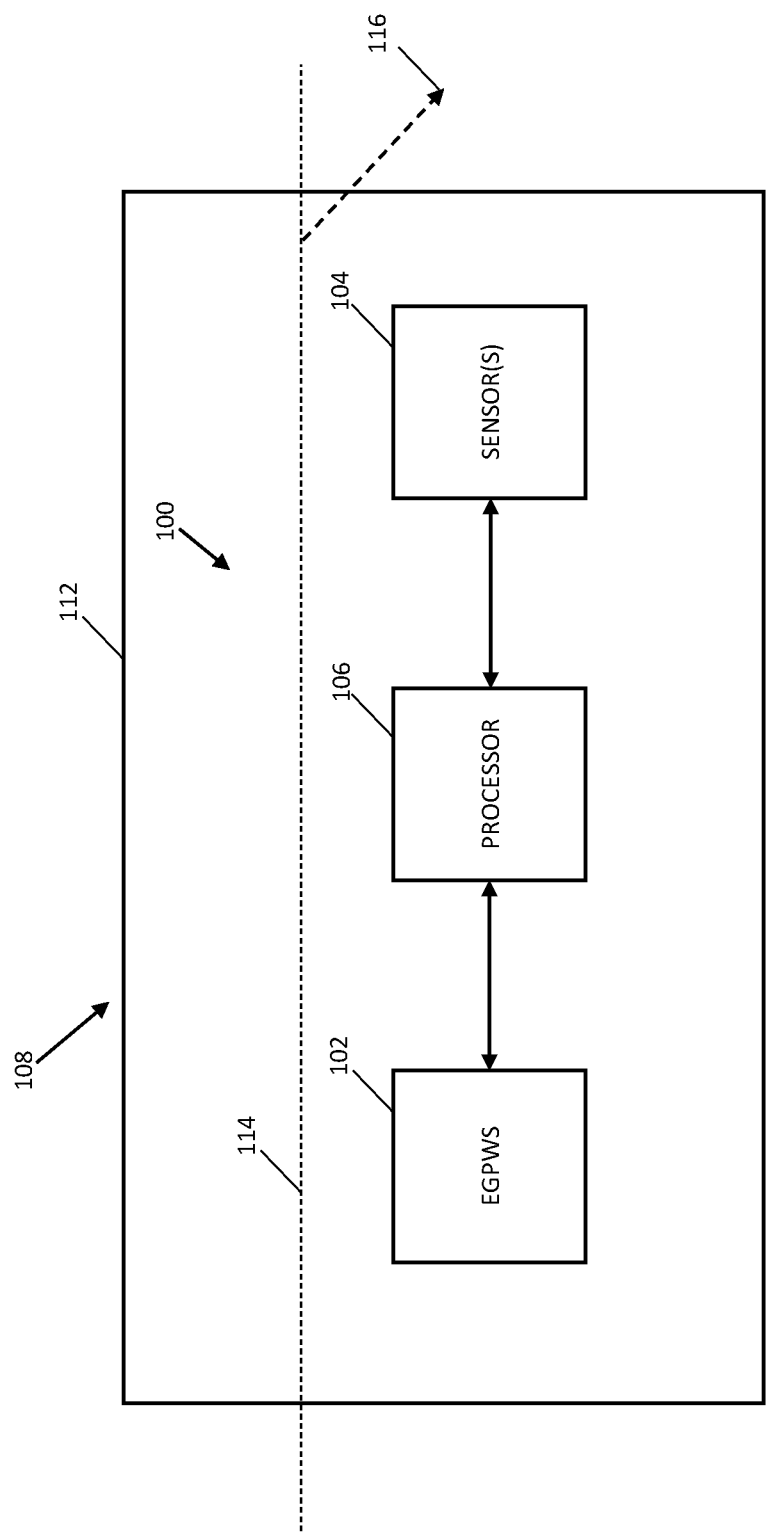
FIG. 1 depicts a functional block diagram of one embodiment of an aircraft system.

Referring to FIG. 1, a functional block diagram of one embodiment of an aircraft system 100 is depicted. The system 100 includes an enhanced ground proximity warning system (EGPWS) 102, at least one sensor 104, and a processor 106. The system 100, at least in the depicted embodiment, is disposed at least partially within an aircraft 108. More specifically, it is disposed within or on the fuselage 112 of a vertical take-off and landing (VTOL) aircraft 108, which is configured to selectively operate in either a helicopter mode or a fixed-wing mode.

The EGPWS 102 is disposed within the fuselage 112 and is configured, in response to a command, to selectively operate as a helicopter EGPWS or as a fixed-wing EGPWS. As noted above, when operating as a helicopter EGPWS, the warning thresholds are set to allow the aircraft 108 to fly at lower altitudes and in more congested areas without triggering a warning, whereas a fixed-wing EGPWS has warning thresholds associated with relatively higher altitude, lower congested flight operations.

The at least one sensor 104 is disposed within or on the fuselage 112. The at least one sensor 104 is configured to sense at least one aircraft flight parameter and to supply sensor data representative of the at least one aircraft flight parameter. The particular flight parameter(s) that is(are) sensed may vary, and thus the particular type of sensor(s) 104 may also vary. As will be discussed in more detail below, in one embodiment the aircraft flight parameter is a thrust vector 116, and in another embodiment the aircraft flight parameter is aircraft speed, in yet another embodiment the aircraft flight parameter may be a phase of flight.

Regardless of the specific type of sensor(s) and specific aircraft flight parameter(s), the processor 106 is in operable communication with the at least one sensor 104 and is configured to process the sensor data to determine when the aircraft 108 is operating in the helicopter mode and when the aircraft 108 is operating in the fixed-wing mode. When the processor 106 determines that the aircraft 108 is operating in the helicopter mode, the processor 106 commands the EGPWS 102 to operate as a helicopter EGPWS. Conversely, when processor 106 determines that the aircraft 108 is operating in the fixed-wing mode, the processor 106 commands the EGPWS 102 to operate as a fixed-wing EGPWS.

It will be appreciated that although the processor 106 is depicted separately from the EGPWS 102, this is done merely for clarity and ease of illustration and description. Indeed, in some embodiments the processor 106 may form part of the EGPWS 102. Depending on the embodiment, the processor 106 may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the processor 106 includes processing logic that may be configured to carry out the functions, techniques, and processing tasks associated with the operation of the system 100 described in greater detail below. Furthermore, the steps of a method or algorithm described in connection with the embodiments disclosed herein may be embodied directly in hardware, in firmware, in a software module executed by the processor 106, or in any practical combination thereof. In accordance with one or more embodiments, the processor 106 includes or otherwise accesses a data storage element, such as a memory (e.g., RAM memory, ROM memory, flash memory, registers, a hard disk, or the like) or another suitable non-transitory short or long term storage media capable of storing computer-executable programming instructions or other data for execution that, when read and executed by the processor 106, cause the processor 106 to execute and perform one or more of the processes, tasks, operations, and/or functions described herein.

As noted above, the one or more aircraft flight parameters may be, in some embodiments, a thrust vector 116. In such embodiments, the processor 106 is configured to determine that the aircraft 108 is operating in the fixed-wing mode when the thrust vector 116 is less than a predetermined angle (a) relative to a reference line 114, and is configured to determine that the aircraft 108 is operating in the helicopter mode when the thrust vector 116 is greater than the predetermined angle (a) relative to the reference line 114. The predetermined angle (a) may vary depending on the particular type of VTOL aircraft 108 and/or the selected location of the reference line 114. In any case, however, it is selected to provide a clear demarcation between operation in the helicopter mode and the fixed-wing mode.

It will additionally be appreciated that the technique used to sense and determine the thrust vector 116 may vary depending, for example, on the configuration of the VTOL aircraft 108. For example, some VTOL aircraft 108, such as the one depicted in FIGS. 2 and 3, include a plurality of propulsion sources 202 (only one visible) that are rotatable, relative to the reference line 114, to a plurality of rotational positions. In such embodiments, the processor 106 is configured to determine the thrust vector 116 based on the rotational position of each of the propulsion sources 202, and is further configured to compare the determined thrust vector 116 to the predetermined angle ($\alpha$).

To implement this functionality, the at least one sensor 102 may be implemented using a plurality of position sensors 204. Each position sensor 204, which may be implemented using any one of numerous types of position sensors, is configured to sense the rotational position of a different one of the plurality of propulsion sources 202 and to supply a rotational position signal representative of the rotational position to the processor 106. The processor 106 receives the rotational position signal from each position sensor 204 and processes the position signals to determine the rotational position of each of the propulsion sources 202.

Figure 2:
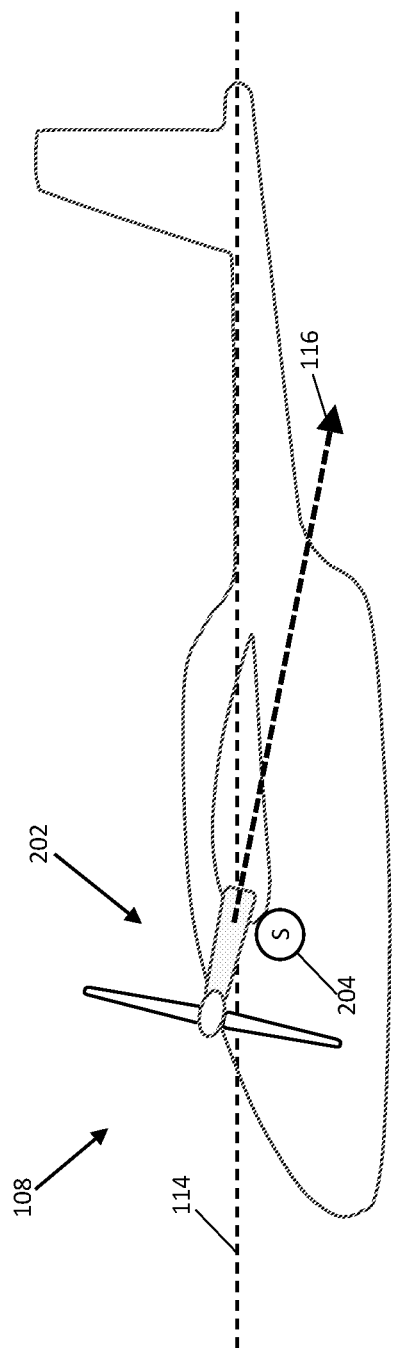
FIGS. 2 and 3 depict simplified views of one embodiment of a vertical take-off and landing (VTOL) aircraft that may include the system of FIG. 1.
Figure 3:
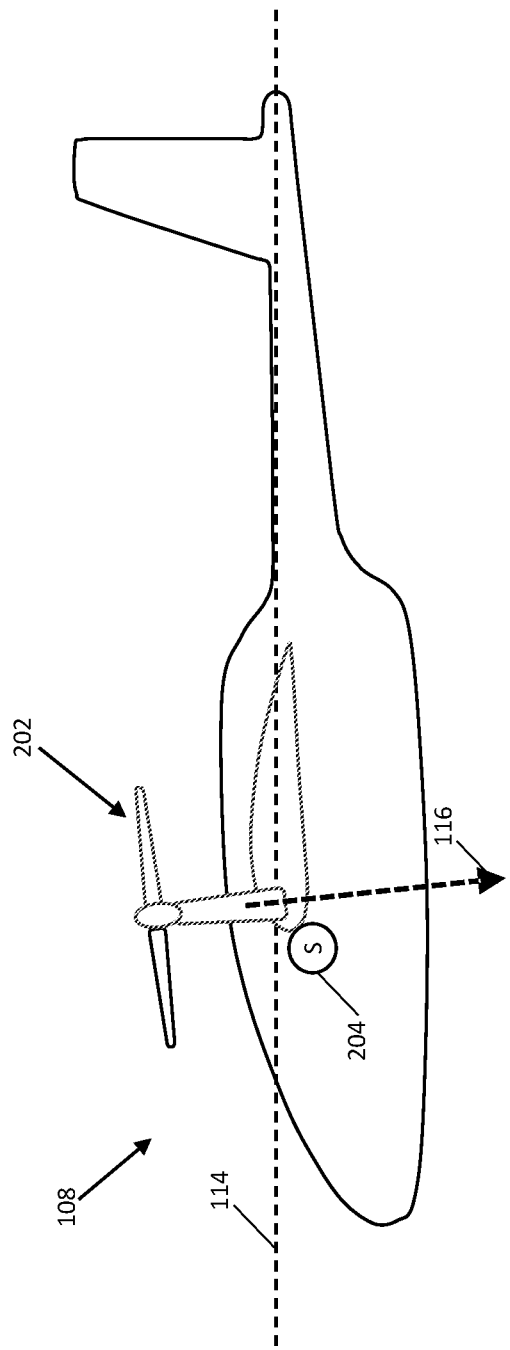
Figure 4:
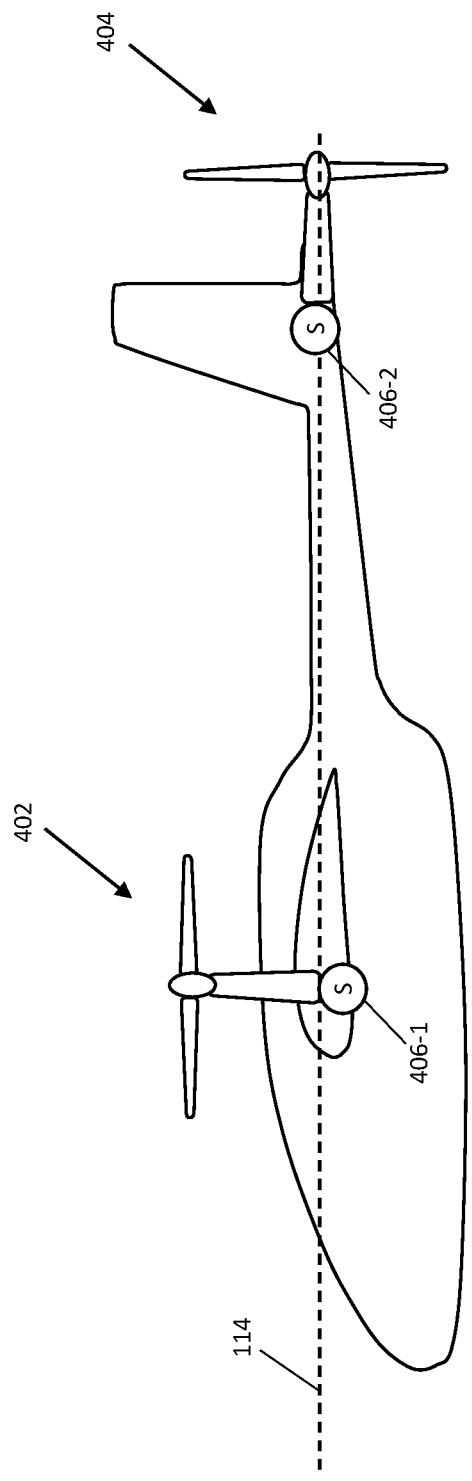
FIG. 4 depicts a simplified view of another embodiment of a VTOL aircraft that may include the system of FIG. 1.

In other embodiments, such as the one depicted in FIG. 4, the VTOL aircraft 108 includes at least one fixed vertical propulsion source 402 and at least one fixed horizontal propulsion source 404. The at least one vertical propulsion source 402 is configured to generate a vertical thrust component, and the at least one horizontal propulsion source 404 is configured to generate a horizontal thrust component, and the processor is configured to determine the thrust vector 116 based on a vector sum of the vertical thrust component and the horizontal thrust component. As used herein, the term "fixed" means that the propulsion sources 402, 404, unlike those in the embodiment depicted in FIGS. 2 and 3, are not rotatable to various positions relative to the reference line 114. Rather, the propulsion sources 402, 404 remain in a fixed position.

To implement this functionality, the at least one sensor 102 may be implemented using at least one first sensor 406-1 and at least one second sensor 406-2. The at least one first sensor 406-1 is coupled to the at least one vertical propulsion source 402 and is configured to sense at least one parameter representative of the vertical thrust component and to supply a first sensor signal representative thereof to the processor 106. Similarly, the at least one second sensor 406-2 is coupled to the at least one horizontal propulsion source 404 and is configured to sense at least one parameter representative of the horizontal thrust component and to supply a second sensor signal representative thereof to the processor 106. The processor 106 receives and processes the first and second sensor signals and is configured to determine the vertical thrust component from the first sensor signal, and the horizontal thrust component from the second sensor signal.

Before proceeding further, it should be noted that the at least one parameter representative of the vertical and horizontal thrust, and thus the at least one first and second sensors 406-1, 406-2, may vary. It should be further noted that the at least one parameter may also vary depending on the type of propulsion sources used. For example, in some embodiments, in which the propulsion sources 402, 404 are non-jet engines, the at least one parameter may be engine torque and/or a predetermined ratio between engine torque on the propulsion sources. In such embodiments, the at least one first and second sensors 406-1, 406-2 are engine torque sensors. In other embodiments, in which the propulsion sources 402, 404 are jet engines, the at least one parameter may be engine pressure ratio (EPR), which is the ratio of the turbine exhaust pressure divided by the pressure at the fan or inlet. In such embodiments, the at least one first and second sensors 406-1, 406-2 are each implemented using two separate pressure sensors for each propulsion source 402, 406.

In other embodiments, as was also previously noted, the one or more aircraft flight parameters may be airspeed. In such embodiments, the processor 106 is configured to determine that the aircraft 108 is operating in the fixed-wing mode when the airspeed is greater than a predetermined speed magnitude, and to determine that the aircraft 108 is operating in the helicopter mode when the airspeed is less than the predetermined speed magnitude. The predetermined speed may vary depending, for example, on the particular type of VTOL aircraft 108. As with the previously described embodiments, however, it is selected to provide a clear demarcation between operation in the helicopter mode and the fixed-wing mode.

To implement this functionality, the at least one sensor 104 may be implemented using at least one airspeed sensor. The at least one airspeed sensor is configured to sense the airspeed and to supply an airspeed signal representative thereof to the processor 106. The processor 106 receives and processes the airspeed signal to determine the airspeed, and then compares the determined airspeed to the predetermined speed magnitude.

Figure 5:
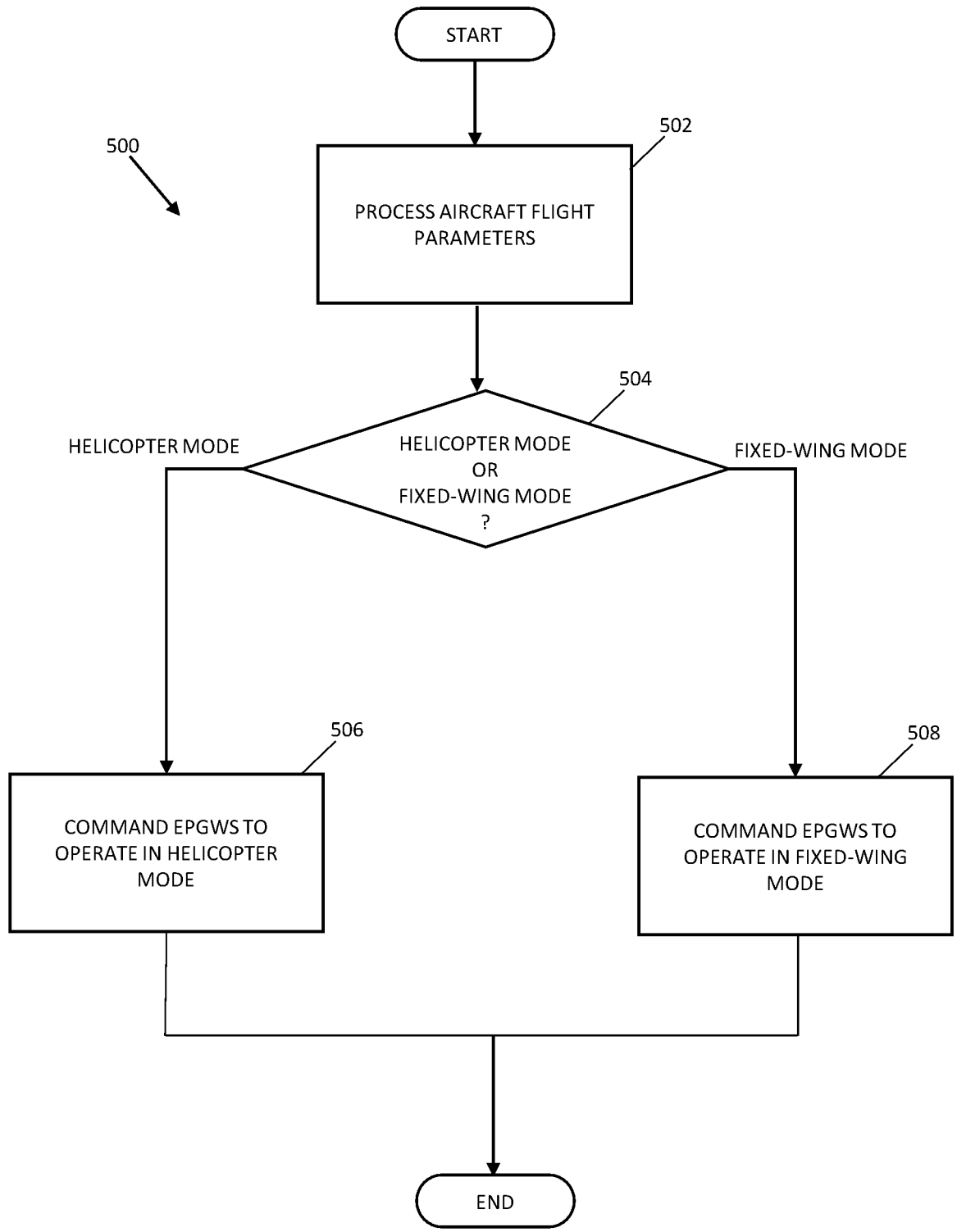
FIG. 5 depicts a process, in flowchart form, of a method that may be implemented in the system of FIG. 1.

Having described the overall functionality of the system 100 generally, a method that is implemented in the system 100 will now be described. The method 500, which is depicted in flowchart form in FIG. 5, represents various embodiments of a method for selectively operating the EGPWS 102 in as a helicopter EPGWS or a fixed-wing EGPWS. For illustrative purposes, the following description of method 500 may refer to elements mentioned above in connection with FIG. 1. In practice, portions of method 500 may be performed by different components of the described system 100. It should be appreciated that method 500 may include any number of additional or alternative tasks, the tasks shown in FIG. 5 need not be performed in the illustrated order, and method 500 may be incorporated into a more comprehensive procedure or method having additional functionality not described in detail herein.

The method 500 starts when the system 100 is initialized. The processor 106 processes the one or more aircraft flight parameters (502) and determines whether the aircraft is operating in the helicopter mode or in the fixed-wing mode (504). When the aircraft 108 is operating in the helicopter mode, the processor 106 commands the EGPWS 102 to operate as a helicopter EGPWS (506). When the aircraft 108 is operating in the fixed-wing mode, the processor 106 commands the EGPWS 102 to operate as a fixed-wing EGPWS (508).

Figure 6:
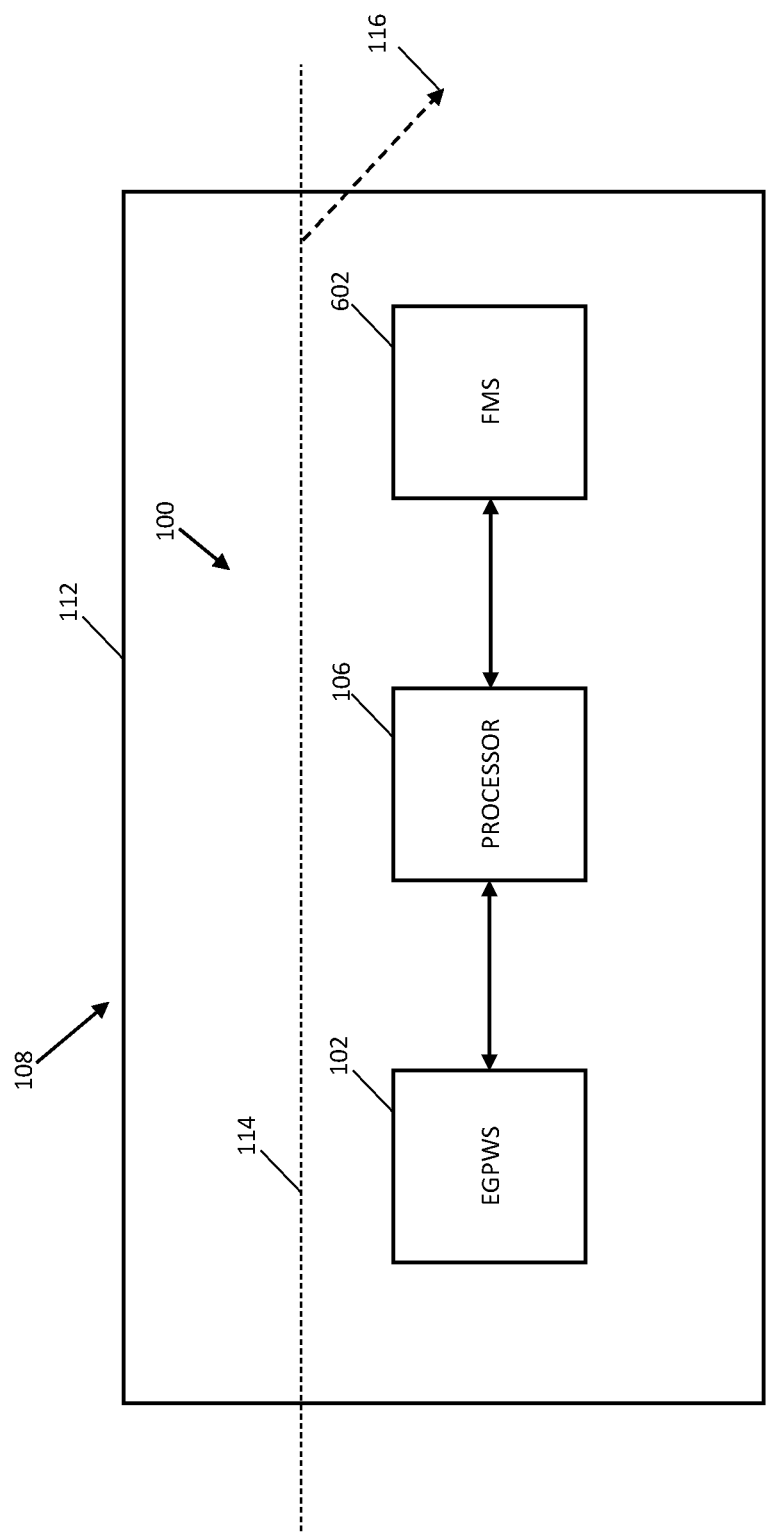
FIG. 6 depicts a functional block diagram of another embodiment of an aircraft system.

As was previously noted, in other embodiments the aircraft flight parameter may be a phase of flight of the aircraft 108. In such embodiments, as depicted in FIG. 6, the system 100 may use a flight management system (FMS) 602 to supply the aircraft flight parameter—that is, the phase of flight of the aircraft 108—to the processor 106. More specifically, with this embodiment, the FMS 602 will supply a signal to the processor 106 indicating the phase of flight of the aircraft 108. The processor 106, in response to this signal, will command the EGPWS 102 to operate as a helicopter EGPWS when the signal indicates that the aircraft 108 is operating in the takeoff mode or the approach mode, indicating that it is in the helicopter mode. Otherwise, when not operating in either the takeoff mode or the approach mode, the aircraft 108 will be considered to be operating in the fixed-wing mode and the processor 106 will command the EGPWS 102 to operate as a fixed-wing EGPWS.

The system and method disclosed herein allows an EGPWS to function as a helicopter EGPWS when an aircraft is operating in a helicopter mode, and as a fixed-wing EGPWS when the aircraft is operating in a fixed-wing mode.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for an aircraft that is configured to selectively operate in both a helicopter mode and a fixed-wing mode, the system comprising:
    an enhanced ground proximity warning system (EGPWS) configured, in response to a command, to selectively operate as a helicopter EGPWS or as a fixed-wing EGPWS;
    at least one sensor configured to sense at least one aircraft flight parameter and to supply sensor data representative of the at least one aircraft flight parameter; and
    a processor in operable communication with the at least one sensor and configured to:
        process the sensor data to determine when the aircraft is operating in the helicopter mode and when the aircraft is operating in the fixed-wing mode;
        command the EGPWS to operate as the helicopter EGPWS when the aircraft is operating in the helicopter mode; and
        command the EGPWS to operate as the fixed-wing EGPWS when the aircraft is operating in the fixed-wing mode.

2. The system of claim 1, wherein the one or more aircraft flight parameters comprise a thrust vector.

3. The system of claim 2, wherein the processor is configured to:
    determine that the aircraft is operating in the fixed-wing mode when the thrust vector is less than a predetermined angle relative to a reference line; and
    determine that the aircraft is operating in the helicopter mode when the thrust vector is greater than the predetermined angle relative to the reference line.

4. The system of claim 3, wherein:
    the aircraft includes a plurality of propulsion sources that are rotatable, relative to the reference line, to a plurality of rotational positions, and
    the processor is further configured to (i) determine the thrust vector based on the rotational position of each of the propulsion sources, and (ii) compare the determined thrust vector to the predetermined angle.

5. The system of claim 4, wherein:
    the at least one sensor comprises a plurality of position sensors, each position sensor configured to sense the rotational position of a different one of the plurality of propulsion sources and to supply a rotational position signal representative of the rotational position; and
    the processor is coupled to receive the rotational position signal from each position sensor and is further configured to process the position signals to determine the rotational position of each of the propulsion sources.

6. The system of claim 3, wherein:
    the aircraft includes at least one vertical propulsion source and at least one horizontal propulsion source, the at least one vertical propulsion source configured to generate a vertical thrust component, the at least one horizontal propulsion source configured to generate a horizontal thrust component; and
    the processor is configured to determine the thrust vector based on a vector sum of the vertical thrust component and the horizontal thrust component.

7. The system of claim 6, wherein:
    the at least one sensor comprises at least one first sensor and at least one second sensor;
    the at least one first sensor is coupled to the at least one vertical propulsion source and is configured to sense at least one parameter representative of the vertical thrust component and to supply a first sensor signal representative thereof;
    the at least one second sensor is coupled to the at least one horizontal propulsion source and is configured to sense at least one parameter representative of the horizontal thrust component and to supply a second sensor signal representative thereof; and
    the processor is coupled to receive the first sensor signal and the second sensor signal and is further configured to:
        determine the vertical thrust component from the first sensor signal, and
        the horizontal thrust component from the second sensor signal.

8. The system of claim 1, wherein the one or more aircraft flight parameters comprise airspeed.

9. The system of claim 8, wherein the processor is further configured to:
    determine that the aircraft is operating in the fixed-wing mode when the airspeed is greater than a predetermined speed magnitude; and determine that the aircraft is operating in the helicopter mode when the airspeed is less than the predetermined speed magnitude.

10. The system of claim 9, wherein:
the at least one sensor comprises at least one airspeed sensor;
the at least one airspeed sensor is configured to sense the airspeed and supply an airspeed signal representative thereof; and
the processor is further configured to (i) process the airspeed signal to determine the airspeed, and (ii) compare the determined airspeed to the predetermined speed magnitude.

11. In an aircraft configured to selectively operate in both a helicopter mode and a fixed-wing mode, a method for controlling operations of an enhanced ground proximity warning system (EGPWS) disposed within the aircraft, the method comprising the steps of:
processing, in a processor, one or more aircraft flight parameters to determine when the aircraft is operating in the helicopter mode and when the aircraft is operating in the fixed-wing mode;
commanding, via the processor, the EGPWS to operate as a helicopter EGPWS when the aircraft is operating in the helicopter mode; and
commanding, via the processor, the EGPWS to operate as a fixed-wing EGPWS when the aircraft is operating in the fixed-wing mode.

12. The method of claim 11, wherein:
the one or more aircraft flight parameters comprise a thrust vector;
determining that the aircraft is operating in the fixed-wing mode when the thrust vector is less than a predetermined angle relative to a reference line; and
determining that the aircraft is operating in the helicopter mode when the thrust vector is greater than the predetermined angle relative to the reference line.

13. The method of claim 12, wherein the aircraft includes a plurality of propulsion sources that are rotatable, relative to the reference line, to a plurality of rotational positions, and wherein the method further comprises:
determining, in the processor, the thrust vector based on the rotational position of each of the propulsion sources; and
comparing, in the processor, the determined thrust vector to the predetermined angle.

14. The method of claim 13, further comprising:
sensing, with position sensors, the rotational position of each of the plurality of propulsion sources and supplying a rotational position signals representative of the rotational positions; and
processing, in the processor, the rotational position signals to determine the rotational position of each of the propulsion sources.

15. The method of claim 14, wherein:
the aircraft includes at least one vertical propulsion source and at least one horizontal propulsion source, the at least one vertical propulsion source configured to generate a vertical thrust component, the at least one horizontal propulsion source configured to generate a horizontal thrust component; and
the method further comprises determining, in the processor, the thrust vector based on a vector sum of the vertical thrust component and the horizontal thrust component.

16. The method of claim 15, further comprising:
sensing, via at least one first sensor, at least one parameter representative of the vertical thrust component and supplying a first sensor signal representative thereof;
sensing, via at least one second sensor, at least one parameter representative of the horizontal thrust component and supplying a second sensor signal representative thereof;
processing, in the processor, the first sensor signal to determine the vertical thrust component, and
processing, in the processor, the second sensor signal to determine the horizontal thrust component.

17. The method of claim 11, wherein:
the one or more aircraft flight parameters comprise airspeed;
determining that the aircraft is operating in the fixed-wing mode when the airspeed is greater than a predetermined speed magnitude; and
determining that the aircraft is operating in the helicopter mode when the airspeed is less than the predetermined speed magnitude.

18. The method of claim 17, further comprising:
sensing, via at least one airspeed sensor, the airspeed and supplying an airspeed signal representative thereof; and
processing, in the processor, the airspeed signal to determine the airspeed; and
comparing, in the processor, the determined airspeed to the predetermined speed magnitude.

19. The method of claim 11, wherein the one or more aircraft flight parameters comprise a phase of flight of the aircraft.

20. A system for an aircraft that is configured to selectively operate in both a helicopter mode and a fixed-wing mode, the system comprising:
an enhanced ground proximity warning system (EGPWS) configured, in response to a command, to selectively operate as a helicopter EGPWS or as a fixed-wing EGPWS;
a flight management system (FMS) configured to at least supply a signal representative of a phase of flight of the aircraft; and
a processor coupled to receive the signal from the FMS and configured, upon receipt thereof, to:
command the EGPWS to operate as the helicopter EGPWS when the signal indicates the phase of flight of the aircraft is either a takeoff mode or an approach mode; and
command the EGPWS to operate as the fixed-wing EGPWS when the phase of flight of the aircraft is neither the takeoff mode nor the approach mode.

* * * * *